United States Patent
Oishi et al.

(10) Patent No.: US 7,129,670 B2
(45) Date of Patent: Oct. 31, 2006

(54) DRIVE DEVICE FOR STEPPER MOTOR AND INDICATING APPARATUS USING THE SAME

(75) Inventors: Masaki Oishi, Shimada (JP); Hidemasa Umehara, Shimada (JP)

(73) Assignee: Yazaki Corporation, Tokyo (JP)

( * ) Notice: Subject to any disclaimer, the term of this patent is extended or adjusted under 35 U.S.C. 154(b) by 194 days.

(21) Appl. No.: 10/861,420

(22) Filed: Jun. 7, 2004

(65) Prior Publication Data
US 2005/0006966 A1    Jan. 13, 2005

(30) Foreign Application Priority Data
Jun. 6, 2003    (JP)    ............ P.2003-162128

(51) Int. Cl.
G05B 19/40    (2006.01)
H02P 1/18    (2006.01)

(52) U.S. Cl. ............ 318/685; 318/587; 318/696

(58) Field of Classification Search ........... 318/599, 318/696, 685, 587, 466
See application file for complete search history.

(56) References Cited

U.S. PATENT DOCUMENTS

| | | | | |
|---|---|---|---|---|
| 5,723,964 A * | 3/1998 | Nakaba | ............ | 318/599 |
| 5,900,711 A * | 5/1999 | Senoo | ............ | 318/696 |
| 6,798,164 B1 * | 9/2004 | Umehara et al. | ............ | 318/685 |
| 6,838,982 B1 * | 1/2005 | Kondo et al. | ............ | 340/438 |
| 6,853,162 B1 * | 2/2005 | Betts et al. | ............ | 318/696 |
| 6,956,351 B1 * | 10/2005 | Yamada | ............ | 318/685 |
| 2003/0214391 A1 * | 11/2003 | Kondo et al. | ............ | 340/425.5 |
| 2004/0108829 A1 * | 6/2004 | Betts et al. | ............ | 318/696 |
| 2005/0024008 A1 * | 2/2005 | Yamada | ............ | 318/685 |
| 2005/0083008 A1 * | 4/2005 | Oishi | ............ | 318/696 |
| 2005/0116678 A1 * | 6/2005 | Yamada | ............ | 318/685 |

FOREIGN PATENT DOCUMENTS

JP    2001-327193 A    1/2001

* cited by examiner

Primary Examiner—Paul Ip
(74) Attorney, Agent, or Firm—Sughrue Mion, PLLC (57) ABSTRACT

A drive device includes stepper motors, each having an excitation coil and a rotor rotating based on variation in the excitation state of the excitation coil; driven members, each moving in accordance with the rotation of the rotor of the corresponding stepper motor; stoppers, each stopping the driven member mechanically at a zero position; and a controller, controlling the respective stepper motors so as to selectively performs either a normal operation in which the stepper motor is driven so as to rotate, or a zero-position detection operation in which the stepper motor is driven so that the driven member is moved to the stopper. The controller starts to perform the zero-position detection operation simultaneously in all of the stepper motors and changes the stepper motor which has terminated the zero-position detection operation to the normal operation without waiting for the termination of the zero-position detection operation in other stepper motors.

3 Claims, 6 Drawing Sheets

DRIVE DEVICE FOR STEPPER MOTOR AND INDICATING APPARATUS USING THE SAME

BACKGROUND OF THE INVENTION

The present invention relates to a drive device for stepper motors applicable to an on-board combination meter and so on and to an indicating apparatus using the drive device.

For example, JP-A-2001-327193 discloses a drive device for controlling the driving of a plurality of stepper motors for use in a tachometer, a fuel meter and so on in an on-board combination meter of the sort mentioned above. The drive device includes a plurality of stepping motors, a plurality of driven members, a plurality of stoppers, a plurality of first excitation members, a plurality of second excitation members, a plurality of detection coils, a position detection member, and control member. Each of the stepping motors has a plurality of excitation coils as well as a rotor magnetized to have N and S magnetic poles and is rotated by following variations in the excitation state of the excitation coils. The driven members moves in response to the rotating operation of the respective rotors. The stoppers mechanically stop the respective driven members in position. The first excitation members rotate the rotors forward and backward by controlling the plurality of excitation coils. The second excitation members control the excitation state of the plurality of excitation coils according to exciting patterns constituted of a plurality of exciting steps for defining the excitation state of the plurality of excitation coils and which reversely rotate the rotors in the direction in which the driven members move to the predetermined positions. The detection coils generate induction voltage in response to the rotation of the rotors. The position detection member sequentially detect the presence or absence of the induction voltage generated in the detection coils during the control operation performed by the second excitation members and detect whether the driven members stop at the predetermined positions where the contact of the driven members against the stoppers is established on the basis of the presence or absence of the detected induction voltage. The control member stops the control operation performed by the first excitation members, and causes the second excitation members to start controlling when the control member receives a command signal. The control member stops the control operation performed by the second excitation members and causes the plurality of first excitation members to start controlling when all the driven members stop at the predetermined positions by the position detection member.

In the drive device described in for example, JP-A-2001-327193, the plurality of stepper motors are such that the reset operation of restoring the driven members (pointers) in position (the zero positions) by a command signal based on ignition is started by a sequential predetermined timing deviation (e.g., a deviation of two excitation steps) and then each stepper motor is shifted to the normal operation wherein the stepper motor is rotated forward or backward according to measured values of the vehicle speed, the number of revolutions and so on after the set operation of the whole stepper motor is terminated.

On the other hand, a drive device of another type is such that the sequence of zero-position detection of a plurality of stepper motors used in an on-board combination meter is controlled so that starting the detection of the zero positions is simultaneously made in the whole built-in stepper motor. In the drive device of this type, in order to deal with the time difference required to detect the zero positions of the stepper motors, it is arranged that any stepper motor that has terminated the zero-position detection waits for the termination of the zero-position detection by any other stepper motor and that each of the stepper motors simultaneously starts giving an indication in unison at a point of time the whole stepper motor terminates the zero-position detection.

In the above-described drive device, the source voltage supplied to a computer within the drive device, used to control the drive device drops because of cranking when a starter is turned to subject an engine to the cranking in order to start the engine in such a state that a fuel meter together with a tachometer and a speedometer contained in the on-board combination meter has started giving an indication according to the measured value. When the computer is reset for preventing malfunction due to the source voltage drop, the computer thus reset causes the stepper motors to start zero-position detection process operation at the time the, power is supplied again immediately after the resetting. With the pointer deflected to an indicating value immediately before the resetting in the fuel meter, it takes time to detect the zero position until the pointer returns to the zero position. Therefore, the tachometer that should start giving an indication corresponding to the measured value after the engine is started cannot start normal operation for giving any indication corresponding to the measured value when the power is supplied to the drive device again until the zero-position detection process operation is terminated in other stepper motors that take time to perform the operation.

Figure 6:
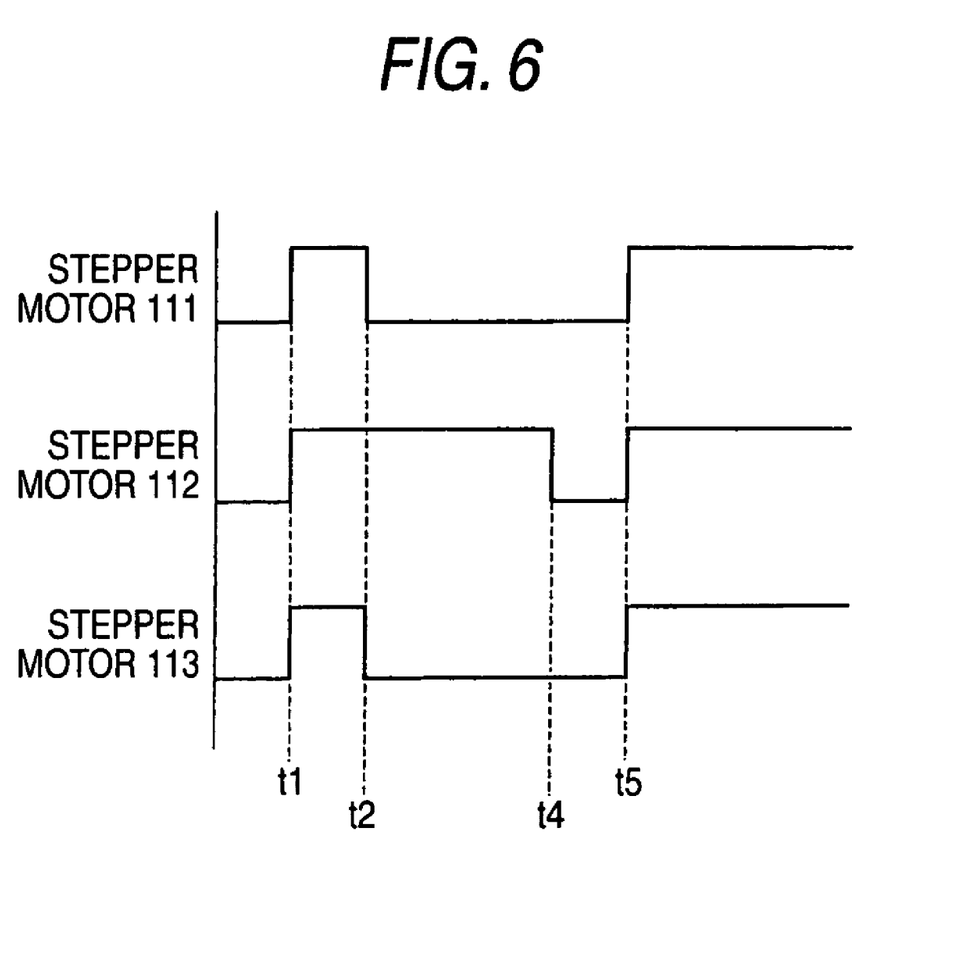
FIG. 6 is a time chart illustrating the driving of a plurality of stepper motors by a related drive device by way of example.

FIG. 6 is a time chart illustrating the driving of a plurality of stepper motors by a conventional drive device by way of example. With a stepper motor 111 acting as a tachometer, a stepper motor 112 acting as a fuel meter and a stepper motor 113 acting as a speedometer, a drive device starts performing a zero-position detection process at time t1 but does not start performing normal operation for giving an indication corresponding to the values measured by the stepper motors 111 and 113 even though the stepper motors 111 and 113 terminate the zero-position detection process at time t2. The drive device just waits for the delayed termination (time t4) of the zero-position detection process performed by the stepper motor 112 and then assumes control so that the stepper motors 111, 112 and 113 start the normal operation in unison at time t5.

As the tachometer operates not to give any indication of the number of revolutions of the engine immediately after the engine is started in the case described above, this nonconformity may give the driver a sense of discomfort.

SUMMARY OF THE INVENTION

It is therefore an object of the present invention to provide a drive device for stepper motors and an indicating apparatus using the drive device capable of efficiently switching between the zero-position detection process operation of a plurality of stepper motors and normal operation.

In order to achieve the above object, according to the present invention, there is provided a drive device, comprising:

a plurality of stepper motors, each of which has an excitation coil and a rotor rotating in accordance with variation in an excitation state of the excitation coil;

a plurality of driven members, each of which moves in accordance with rotation of the rotor of the corresponding stepper motor;

a plurality of stoppers, each of which stops the corresponding driven member mechanically at a zero position; and a controller, which controls the respective stepper motors so as to selectively performs either a normal operation in which the stepper motor is rotatably driven, or a zero-position detection operation in which the stepper motor is driven so that the driven member is moved to the stopper for detecting the zero position of the driven member, wherein the controller starts to perform the zero-position detection operation simultaneously in all of the stepper motors; and wherein the controller changes the stepper motor which has terminated the zero-position detection operation to the normal operation before other stepper motor terminates the zero-position detection operation.

In the above configuration, the drive device is capable of efficiently switching between the zero-position detection operation and normal operation in the plurality of stepper motors.

Preferably, The drive device further comprising:

a plurality of detection coils, each of which generates induction voltage in response to the rotation of the corresponding rotor; and a plurality of zero-position detection members, each of which detects contact of the corresponding driven member against the corresponding stopper at the zero position on the basis of level of the induction voltage from the corresponding detection coil. The controller changes the stepper motor which has terminated the zero-position detection operation to the normal operation on the basis of a zero-position detection signal from the corresponding zero-position detection member.

In the above configuration, the drive device is capable of efficiently switching between the zero-position detection operation and normal operation in the plurality of stepper motors.

According to the present invention, there is also provided an indicating apparatus having the drive device, comprising:

a plurality of indicators, each of which has:

a dial plate, which has graduations; and a pointer, which is provided on the driven member, and which points the scale on the dial plate, the pointer mechanically stopped by the stopper at a zero position of the graduations on the dial plate, wherein the controller controls the stepper motor so as to move the pointer toward the stopper by a full scale of the indicator in the zero-position detection operation.

In the above configuration, the zero-position detection operation can be restored quickly to the normal operation.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

An embodiment of the invention will now be described by reference to the drawings.

Figure 1:
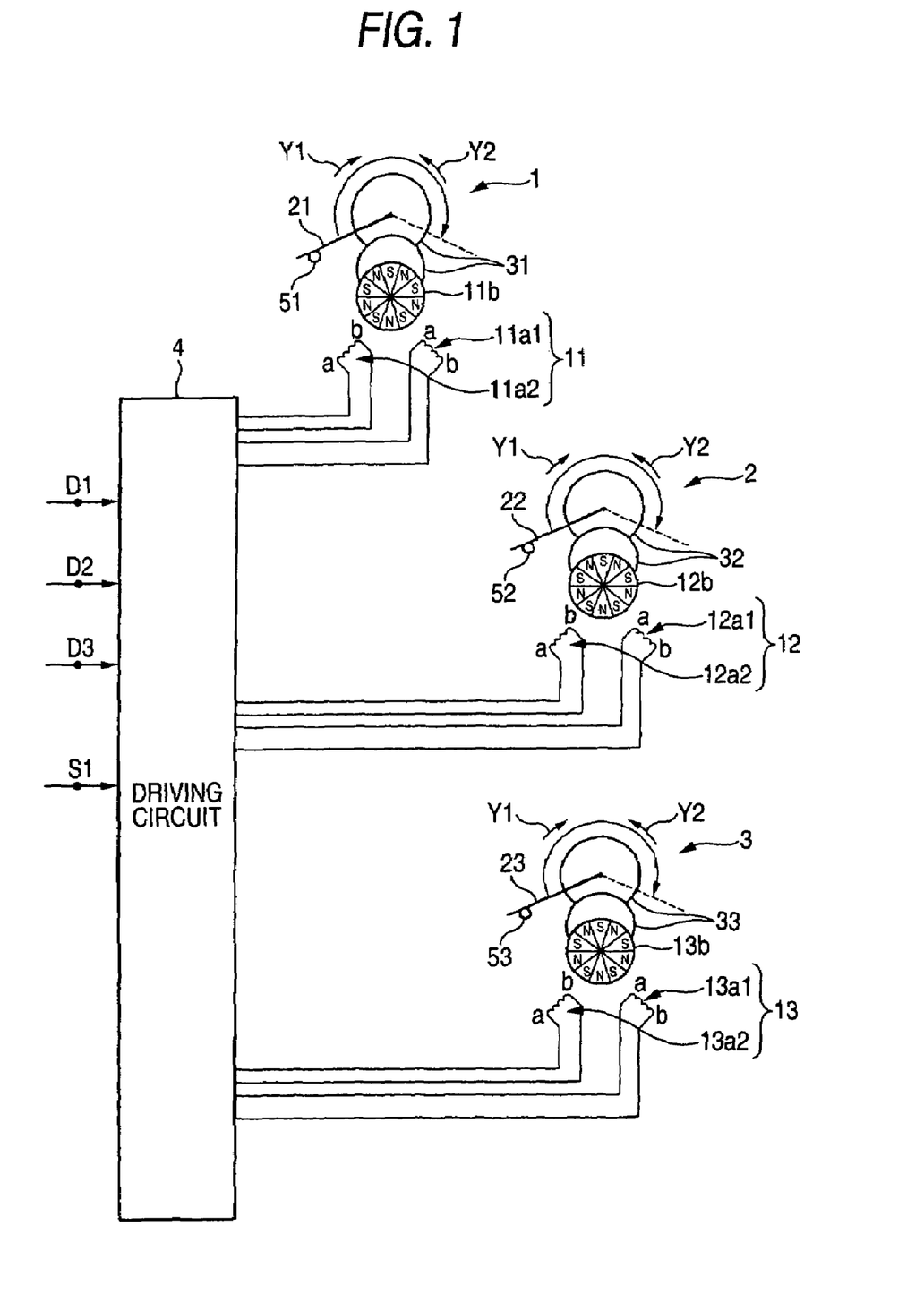
FIG. 1 is a diagram showing an indicating apparatus incorporating a drive device for driving stepper motors according to an embodiment of the invention.

FIG. 1 is a diagram showing an indicating apparatus incorporating a drive device for driving stepper motors according to the embodiment of the invention. The indicating apparatus serves as an on-board combination meter including a tachometer 1, a fuel meter 2 and a speedometer 3. For example, the meters 1, 2 and 3 have corresponding stepper motors 11, 12 and 13. The stepper motors 11, 12 and 13 respectively have a pair of excitation coils 11a1 and 11a2, a pair of excitation coils 12a1 and 12a2 and a pair of excitation coils 13a1 and 13a2, and rotors 11b, 12b and 13b, each having and being magnetized by five sets of N and S magnetic poles alternately arranged, which are rotated by following variations in the excitation state of the pairs of excitation coils 11a1 and 11a2, 12a1 and 12a2 and 13a1 and 13a2.

Further, the indicating apparatus includes a plurality of pointers 21, 22 and 23 as driven members operating in response to the rotational operation of the rotors 11b, 12b and 13b; a plurality of gears 31, 32 and 33 for transmitting the torque of the rotors 11b, 12b and 13b to the pointers 21, 22 and 23; driving circuits 4 for rotating the rotors 11b, 12b and 13b by controlling the excitation state of the pairs of excitation coils 11a1 and 11a2, 12a1 and 12a2 and 13a1 and 13a2; and a plurality of stoppers 51, 52 and 53 for mechanically stopping the pointers 21, 22 and 23 at positions indicating a zero value (hereinafter called the zero positions).

Figure 2:
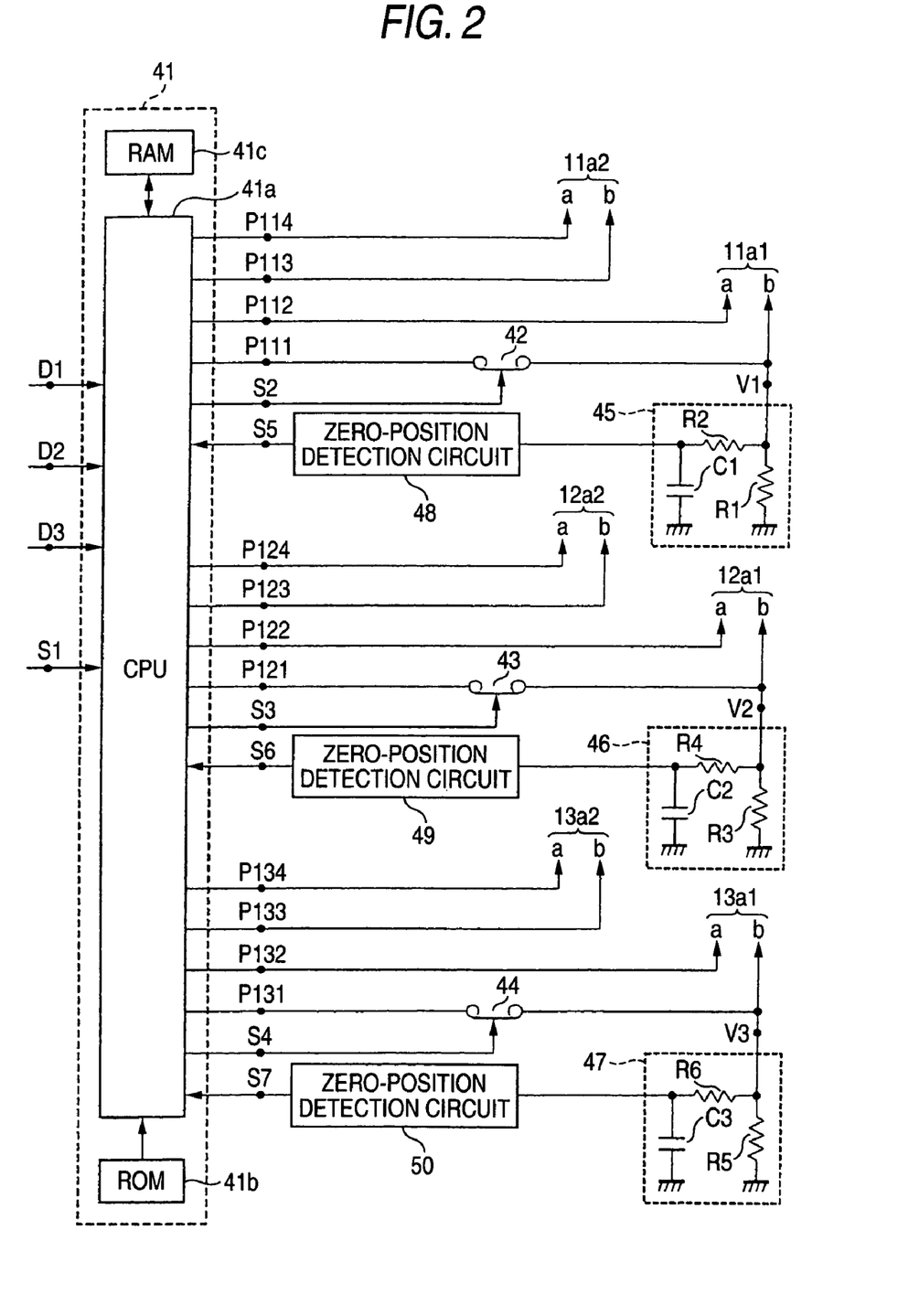
FIG. 2 is a diagram showing an arrangement of the drive device in FIG. 1.

The driving circuits 4 will be described next. As shown in FIG. 2, the driving circuits 4 have a microcomputer 41 including a central processing unit (CPU) 41a for performing various processes according to programs, ROM 41b as a read only memory for storing programs to be processed by the CPU 41a, work areas utilized by the CPU 41a at the various processing stages, and RAM 41c as a read/write memory having a data storage area for storing various kinds of data and so on. These components are mutually connected via bus lines.

The CPU 41a receives an angle data signal D1 calculated according to information provided by a rotary sensor (not shown) on the number of revolutions of an engine, an angle data signal D2 calculated according to information provided by a liquid level sensor (not shown) on the residual quantity of fuel, an angle data signal D3 calculated according to information provided by a vehicle speed sensor (not shown) on vehicle speed, and a high-level initialization command signal S1 resulting from the operation of an ignition switch (not shown). The CPU 41a also transmits excitation pulses P111–114, 121–124, 131–134 to both ends a and b of the excitation coils 11a1 and 11a2, both ends a and b of 12a1 and 12a2 and both ends a and b of 13a1 and 13a2, respectively.

The driving circuits 4 have switches 42, 43 and 44 subjected to opening control by detection timing signals S2–S4 supplied from CPU 41a to each of control terminals thereof. The switches 42, 43 and 44 are respectively provided on the connecting lines between the CPU 41a and one ends b of the excitation coils 11a1, 12a1 and 13a1.

The driving circuits 4 also have low-pass filters 45, 46 and 47 connected to one ends b of the excitation coils 11a1, 12a1 and 13a1. The low-pass filter 45 includes a resistor R1 connected between one end b of the excitation coil 11a1 and the ground a resistor R2 one end of which is connected to one end b of the excitation coil 11a1, and a capacitor C1 connected between the other end of the resistor R2 and the ground. The low-pass filter 46 includes a resistor R3 connected between one end b of the excitation coil 12a1 and the ground, a resistor R4 connected to one end b of the excitation coil 12a1 and a capacitor C2 connected between the other end of the resistor R4 and the ground. Further, the low-pass filter 47 includes a resistor R5 connected between one end b of the excitation coil 13a1 and the ground, a resistor R6 one end of which is connected to one end b of the excitation coil 13a1, and a capacitor C3 connected between the other end of the resistor R6 and the ground.

The driving circuits 4 receive the outputs of the low-pass filters 45, 46 and 47, and have zero-position detection circuits 48, 49 and 50 as position detection members for transmitting to the CPU 41a a zero-position decision signal for deciding that the contact of the pointers 21, 22 and 23 against the stoppers 51, 52 and 53 has been established to hold the zero position.

Figure 3:
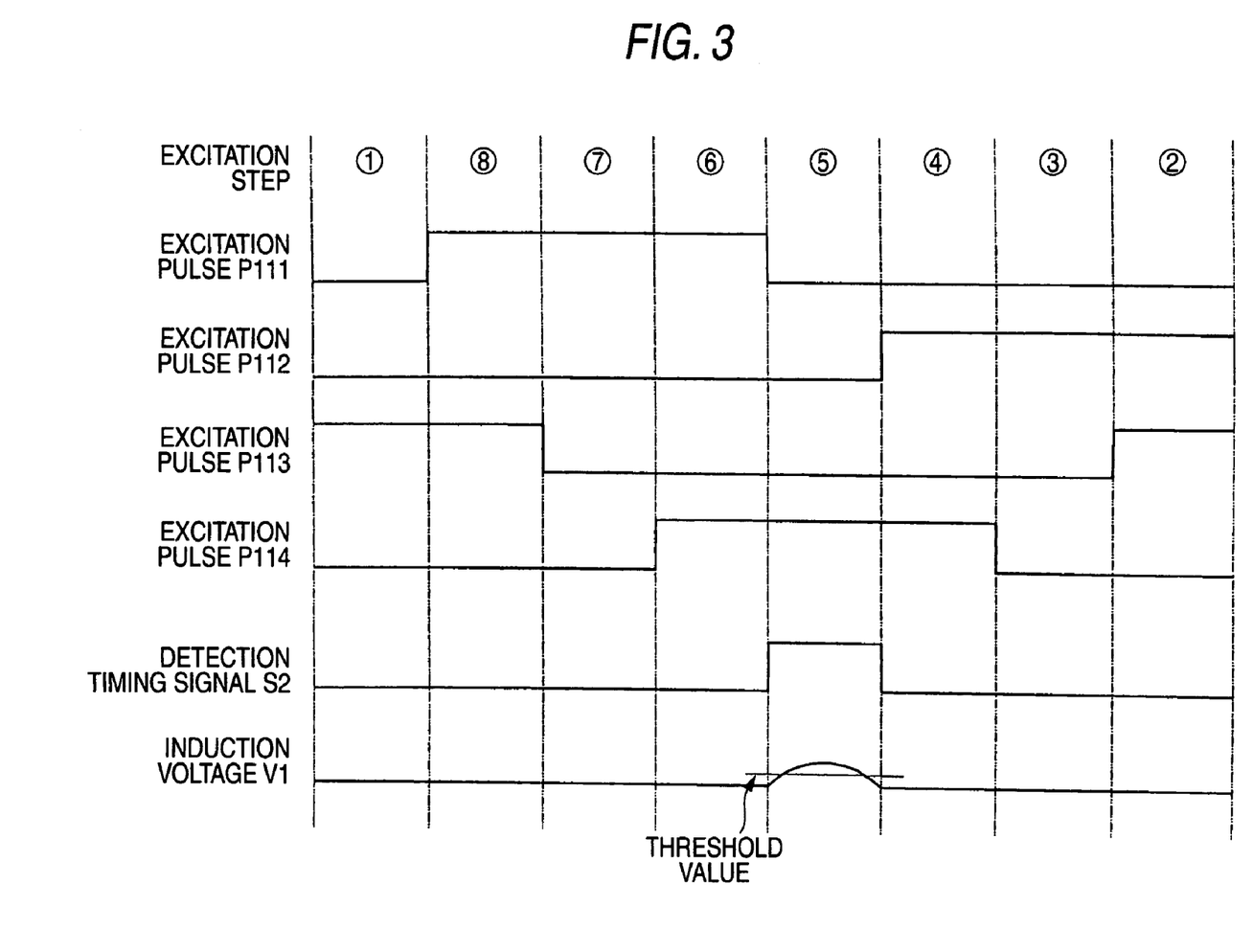
FIG. 3 is a time chart showing signal waveforms of the respective parts of the drive device in FIG. 1.

The operation of the indicating apparatus thus arranged above will now be described by reference to a time chart of FIG. 3. During the normal operation, the CPU 41a controls the excitation state of the excitation coils 11a1 and 11a2 with the excitation pulses P111–114 having a first excitation pattern on a half-step driving system in response to the input of the angle data signal D1 as well as controlling the driving of the stepper motor 11 so that the rotor 11b is reversibly rotated forward (Y1) or backward (Y2) in a manner corresponding to the angle data signal D1 to make the pointer 21, indicate the numerical value of revolutions of the engine. During the initialization process, the CPU 41a controls the excitation state of the excitation coils 11a1 and 11a2 by switching the excitation pattern of the excitation pulses P111–114 from the first excitation pattern to a second excitation pattern in order of excitation steps 1→8→7→6→5→4→3→2 as shown in FIG. 3 in response to the input of the initialization command signal S1 as well as controlling the driving of the stepper motor 11 so that the rotor 11b is rotated backward to make the pointer 21 move in the direction of the stopper 51 (i.e., in the direction of Y2).

During the initialization process, the zero-position detection circuit 48 receives induction voltage V1 generated across the excitation coil 11a1 acting as a non-excited detection coil with one end opened via the low-pass filter 45 when the switch 42 controlled by the detection timing signal S2 supplied from the CPU 41a at the timing of the excitation step 5 is opened and sends to the CPU 41a a zero-position decision signal S5 for deciding that the contact of the pointer 21 against the stopper 51 has been established to hold the zero position when the induction voltage V1 thus supplied becomes equal to or smaller than a preset threshold.

On receiving the zero-position decision signal S5 from the zero-position detection circuit 48, the CPU 41a switches the excitation pattern of the excitation pulses supplied to the excitation coils 11a1 and 11a2, from the second excitation pattern to the first excitation pattern and causes the rotor 11b to be reversibly rotated in a manner corresponding to the angle data signal D1 to move the pointer 21 so as to indicate the numerical value of revolutions of the engine according to the measured value.

Similarly, during the normal operation, the CPU 41a controls the excitation state of the excitation coils 12a1 and 12a2 with the excitation pulses P121–124 having a first excitation pattern on the half-step driving system in response to the input of the angle data signal D2 as well as controlling the driving of the stepper motor 12 so that the rotor 12b is reversibly rotated forward (Y1) or backward (Y2) in a manner corresponding to the angle data signal D2 to make the pointer 22 indicate the residual value of fuel of the vehicle. During the initialization process, the CPU 41a controls the excitation state of the excitation coils 12a1 and 12a2 by switching the excitation pattern of the excitation pulses P121–124 from the first excitation pattern to a second excitation pattern (though not shown but in order similar to those shown in FIG. 3) in response to the input of the initialization command signal S1 as well as controlling the driving of the stepper motor 12 so that the rotor 12b is rotated backward to make the pointer 22 move in the direction of the stopper 52 (i.e., in the direction of Y2).

During the initialization process, the zero-position detection circuit 49 receives induction voltage V2 generated across the excitation coil 12a1 acting as a non-excited detection coil with one end opened via the low-pass filter 46 when the switch 43 controlled by the detection timing signal S3 supplied from the CPU 41a is opened and sends to the CPU 41a a zero-position decision signal S6 for deciding that the contact of the pointer 22 against the stopper 52 has been established to hold the zero position when the induction voltage V2 thus supplied becomes equal to or smaller than a preset threshold.

On receiving the zero-position decision signal S6 from the zero-position detection circuit 49, the CPU 41a switches the excitation pattern of the excitation pulses supplied to the excitation coils 12a1 and 12a2, from the second excitation pattern to the first excitation pattern and causes the rotor 12b to be reversibly rotated in a manner corresponding to the angle data signal D2 to move the pointer 22 so as to indicate the residual value of the fuel of the engine according to the measured value.

During the normal operation, further, the CPU 41a controls the excitation state of the excitation coils 13a1 and 13a2 with the excitation pulses P131–134 having a first excitation pattern on the half-step driving system in response to the input of the angle data signal D3 as well as controlling the driving of the stepper motor 13 so that the rotor 13b is reversibly rotated forward (Y1) or backward (Y2) in a manner corresponding to the angle data signal D3 to make the pointer 23 indicate the traveling speed value of the vehicle. During the initialization process, the CPU 41a controls the excitation state of the excitation coils 13a1 and 13a2 by switching the excitation pattern of the excitation pulses P131–134 from the first excitation pattern to a second excitation pattern (though not shown but, in the order similar to those shown in FIG. 3) in response to the input of the initialization command signal S1 as well as controlling the driving of the stepper motor 12 so that the rotor 13b is rotated backward to make the pointer 23 contact with the stopper 53 and move in the direction of the stopper 51 (i.e., in the direction of Y2).

During the initialization process, the zero-position detection circuit 50 receives induction voltage V3 generated across the excitation coil 13a1 acting as a non-excited detection coil with one end opened via the low-pass filter 47 when the switch 44 controlled by the detection timing signal S4 supplied from the CPU 41a is opened and sends to the CPU 41a a zero-position decision signal S7 for deciding that the contact of the pointer 23 against the stopper 53 has been established to hold the zero position when the induction voltage V3 thus supplied becomes equal to or smaller than a preset threshold.

On receiving the zero-position decision signal S7 from the zero-position detection circuit 50, the CPU 41a switches the excitation pattern of the excitation pulses supplied to the excitation coils 13a1 and 13a2, from the second excitation pattern to the first excitation pattern and causes the rotor 13b to be reversibly rotated in a manner corresponding to the angle data signal D3 to move the pointer 23 so as to indicate the traveling speed value of the vehicle according to the measured value.

Figure 4:
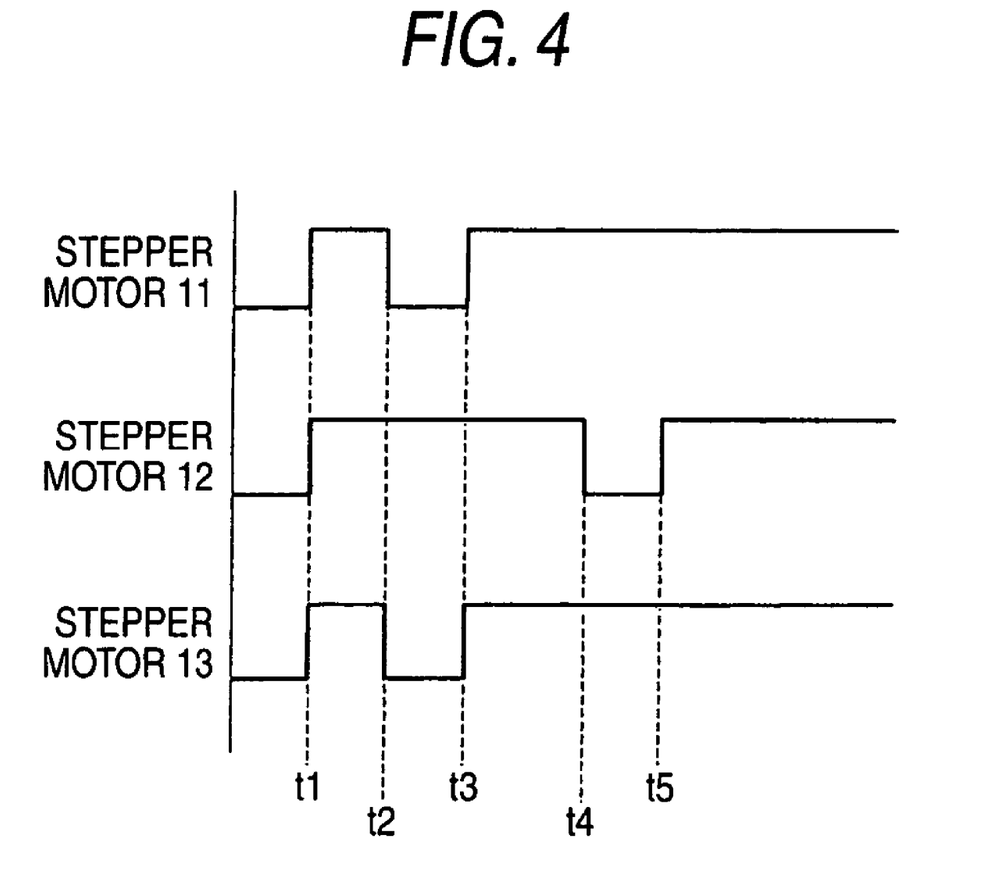
FIG. 4 is a time chart explanatory of an example of a plurality of stepper motors driven by the drive device in FIG. 1.

FIG. 4 is a time chart explanatory of an example of a plurality of stepper motors driven by the drive device according to the invention described above. More specifically, in case there are a stepper motor 11 functioning as a tachometer, a stepper motor 12 as a fuel meter and a stepper motor 13 as a speedometer, the driving circuits 4 simultaneously start the zero-position detection process at time t1 in response to the initialization command signal S1 and when the stepper motors 11 and 13 terminate the zero-position detection process at time t2, also start the normal operation for giving indications corresponding to the values measured by the stepper motors 11 and 13 at time t3.

On the other hand, the driving circuits 4 so control the stepper motor 12 as to start the normal operation corresponding to the measured value at time t5 after the stepper motor 12 where zero-position detection process remains delayed terminates the zero-position detection process at time t4 later than time t3.

Consequently, the stepper motors 11 and 13 are seen to make the tachometer and the speedometer give indications sooner by (t5-t3) than before on comparison between FIG. 4 and FIG. 6, so that the driver is restrained from feeling uncomfortable.

Figure 5:
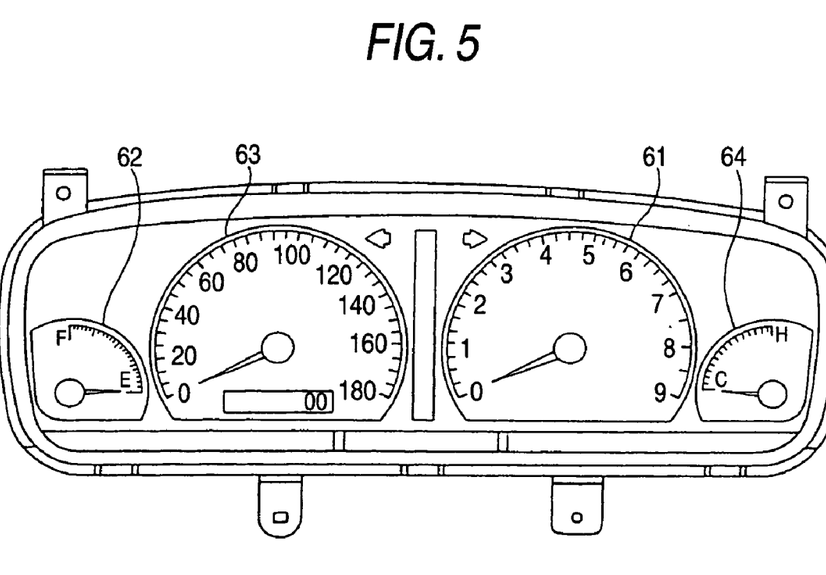
FIG. 5 is an elevational view of an on-board combination meter as an indicating apparatus using the driving device according to the invention.

FIG. 5 is an elevational view of an on-board combination meter as an indicating apparatus using the drive device as illustrated from FIGS. 1 to 4 according to the invention.

As shown in FIG. 5, the on-board combination meter has a dial plate 61 for the tachometer 1 using the stepper motor 11, a dial plate 62 for the fuel meter 2 using the stepper motor 12 and a dial plate 63 for the speedometer 3 using the stepper motor 13. Moreover, the on-board combination meter has a dial plate 64 for a water-temperature gauge, which also uses a stepper motor (not shown) that is driven under the control of the driving circuits 4.

The dial plates 61, 62, 63 and 64 have graduations for use in indicating the number of revolutions of the engine, the residual quantity of fuel, traveling speed and water temperature, and the maximum value on each dial plate is set at an angle different from the zero position. In other words, a full scale from the zero position up to the maximum value on each of the dial plates 62 and 64 for the fuel meter 2 and water temperature is narrow, whereas the full scale on each of the dial plates 61 and 63 for the tachometer 1 and the speedometer 3 is set wider than that of each of the fuel meter 2 and water temperature.

In the on-board combination meter, the driving circuits 4 control the corresponding stepper motors so that the stepper motors are reversely rotated by the full scale of each of the dial plates 61, 62, 63 and 64 at the time of performing the zero-position detection process.

The zero-position detection process in the meter having a narrow full scale can be terminated quickly by thus controlling the driving of the driving circuits 4, so that switching between the operation of performing the zero-position detection process and the normal operation in the plurality of stepper motors can be carried out efficiently.

Although the embodiment of the invention has thus been described, the invention is not limited to the embodiment thereof but may be modified and applied in various different manners.

Although the drive device has been used to control the driving of the three stepper motors according to the embodiment of the invention, for example, the invention is not limited to the embodiment thereof but may be arranged so that such a drive device is employed for controlling the driving of two to four or more of stepper motors.

What is claimed is:

1. A drive device, comprising:
   a plurality of stepper motors, each of which has an excitation coil and a rotor rotating in accordance with variation in an excitation state of the excitation coil;
   a plurality of driven members, each of which moves in accordance with rotation of the rotor of the corresponding stepper motor;
   a plurality of stoppers, each of which stops the corresponding driven member mechanically at a zero position; and
   a controller, which controls the respective stepper motors so as to selectively perform either a normal operation in which a respective stepper motor is rotatably driven, or a zero-position detection operation in which the respective stepper motor is driven so that the driven member is moved to the stopper for detecting the zero position of the driven member,
   wherein the controller starts to perform the zero-position detection operation simultaneously in all of the stepper motors; and
   wherein the controller changes a stepper motor which has terminated the zero-position detection operation to the normal operation before at least one other stepper motor terminates the zero-position detection operation.

2. The drive device as set forth in claim 1, further comprising:
   a plurality of detection coils, each of which generates induction voltage in response to the rotation of the corresponding rotor; and
   a plurality of zero-position detection members, each of which detects contact of the corresponding driven member against the corresponding stopper at the zero position on the basis of level of the induction voltage from the corresponding detection coil,
   wherein the controller changes the stepper motor which has terminated the zero-position detection operation to the normal operation on the basis of a zero-position detection signal from the corresponding zero-position detection member.

3. An indicating apparatus having the drive device as set forth in claim 1, comprising:
   a plurality of indicators, each indicator comprising:
      a dial plate, which has graduations; and
      a pointer, which is provided on the driven member, and which points to a scale on the dial plate, the pointer mechanically stopped by the stopper at a zero position of the graduations on the dial plate,
   wherein the controller controls the stepper motor so as to move the pointer toward the stopper by a full scale of the indicator in the zero-position detection operation.

* * * * *